US009425676B2

(12) United States Patent
Liu et al.

(10) Patent No.: US 9,425,676 B2
(45) Date of Patent: Aug. 23, 2016

(54) CONTROL METHOD FOR SERIES RESONANT CONVERTER

(71) Applicant: ZTE Corporation, Shenzhen, Guangdong (CN)

(72) Inventors: Xichuan Liu, Shenzhen (CN); Shenghua Bao, Shenzhen (CN); Zhou Chen, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 0 days.

(21) Appl. No.: 14/438,751

(22) PCT Filed: Jun. 21, 2013

(86) PCT No.: PCT/CN2013/077716
§ 371 (c)(1),
(2) Date: Apr. 27, 2015

(87) PCT Pub. No.: WO2013/167002
PCT Pub. Date: Nov. 14, 2013

(65) Prior Publication Data
US 2015/0263598 A1    Sep. 17, 2015

(30) Foreign Application Priority Data
Oct. 31, 2012   (CN) .......................... 2012 1 0428206

(51) Int. Cl.
*H02M 3/335*    (2006.01)
*H02M 1/00*     (2006.01)
(Continued)

(52) U.S. Cl.
CPC ................ *H02M 1/00* (2013.01); *H02M 3/337* (2013.01); *H02M 3/33569* (2013.01);
(Continued)

(58) Field of Classification Search
CPC ..... H02M 1/00; H02M 1/4241; H02M 3/335; H02M 3/33507; H02M 3/33569; H02M 3/33592; H02M 3/337; H02M 3/3376; H02M 2001/0003; H02M 2001/0032; H02M 2001/0058; H02M 2007/4815; H02M 2007/4818; H02M 7/4826; H02M 7/523; Y02B 70/1433

See application file for complete search history.

(56) References Cited

U.S. PATENT DOCUMENTS 6,853,173 B2 *  2/2005  Caine .................... H02M 3/157
                                              323/283
8,284,570 B2    10/2012  Zhu
(Continued)

FOREIGN PATENT DOCUMENTS

| CN | 1885699 A | 12/2006 |
|----|-----------|---------|
| CN | 1909351 A | 2/2007  |

(Continued)

OTHER PUBLICATIONS

International Search Report in international application No. PCT/CN2013/077716, mailed on Sep. 26, 2013.
(Continued)

*Primary Examiner* — Timothy J Dole
*Assistant Examiner* — Shahzeb K Ahmad
(74) *Attorney, Agent, or Firm* — Oppedahl Patent Law Firm LLC

(57) ABSTRACT

Disclosed is a control method for a series resonant converter is provided, which includes: a feedback signal is acquired by collecting an analog output signal of a series resonant converter, and an operating frequency of the series resonant converter is changed according to the feedback signal; the series resonant converter adopts a hybrid control mode combing frequency and width modulation with width-fixed frequency modulation when lightly loaded or unloaded and a frequency modulation control mode when heavily loaded, wherein a switching can be conducted between the hybrid control mode and the frequency modulation control mode through hysteresis control. By adopting a hybrid control mode when a series resonant converter is lightly loaded or unloaded and switching between the hybrid control mode and a frequency modulation control mode through hysteresis control, the disclosure effectively addresses the problem that the voltage of a series resonant converter is unstable when the series resonant converter is lightly loaded or unloaded at a low voltage, effectively expands the output range of the series resonant converter, and also addresses the problems that it is difficult to control a loop due to the monotony of the gain of an output voltage during a duty cycle adjustment process.

5 Claims, 5 Drawing Sheets

(51) Int. Cl.
H02M 3/337 (2006.01)
H02M 7/523 (2006.01)

(52) U.S. Cl.
CPC ..... *H02M 3/33576* (2013.01); *H02M 3/33507* (2013.01); *H02M 7/523* (2013.01); *H02M 2001/0003* (2013.01); *H02M 2001/0032* (2013.01); *H02M 2001/0058* (2013.01); *Y02B 70/1433* (2013.01); *Y02B 70/1491* (2013.01)

(56) References Cited

U.S. PATENT DOCUMENTS

| | | | |
|---|---|---|---|
| 8,406,014 B2 | 3/2013 | Liu | |
| 8,767,416 B2 * | 7/2014 | Ying | H02M 3/3376 363/132 |
| 8,817,498 B2 * | 8/2014 | Choi | H02M 3/3387 363/131 |
| 9,143,043 B2 * | 9/2015 | Zhang | H02M 3/33546 |
| 2009/0034298 A1 | 2/2009 | Liu | |
| 2009/0218994 A1 | 9/2009 | Liu | |
| 2009/0303750 A1 | 12/2009 | Zhu | |
| 2010/0061129 A1 * | 3/2010 | Fujii | H02M 1/10 363/127 |
| 2010/0188870 A1 | 7/2010 | Christensen | |
| 2012/0153919 A1 * | 6/2012 | Garbossa | H02M 3/156 323/284 |
| 2012/0163039 A1 | 6/2012 | Halberstadt | |
| 2014/0003094 A1 * | 1/2014 | Sorensen | H02M 3/337 363/21.02 |

FOREIGN PATENT DOCUMENTS

| | | |
|---|---|---|
| CN | 1992493 A | 7/2007 |
| CN | 101056061 A | 10/2007 |
| CN | 101707440 A | 5/2010 |
| CN | 101814838 A | 8/2010 |
| CN | 101867296 A | 10/2010 |

OTHER PUBLICATIONS

English Translation of the Written Opinion of the International Search Authority in international application No. PCT/CN2013/077716, mailed on Sep. 26, 2013.
Supplementary European Search Report in European application No. 13788628.9, mailed on Apr. 5, 2016.
Anonymous:"L6599—High-voltage resonantcontroller",Internet Citation, May 15, 2006, pp. 1-36,XP002525804,Retrieved from the Internet:URL:http://www.ed-china.com/ARTICLES/2006JUL/3/2006JUL11 PM POW OT.pdf?SOURCES DOWNLOAD, mailed on May 15, 2006.

* cited by examiner

Fig. 1    -- Prior Art --
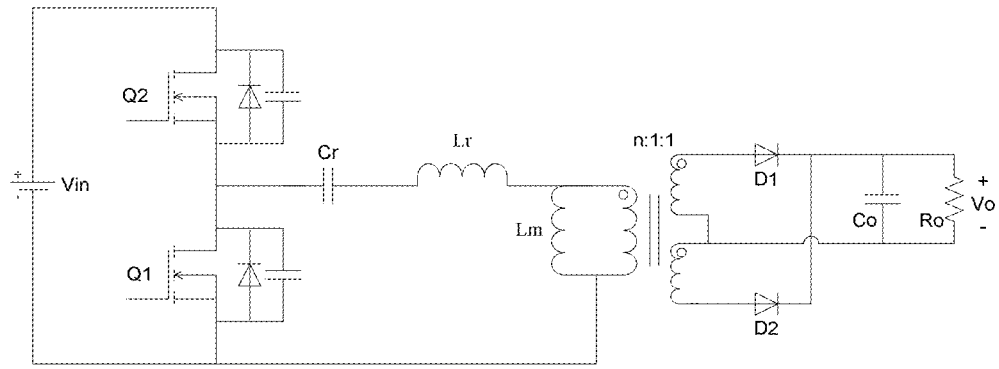
Fig. 2    -- Prior Art --
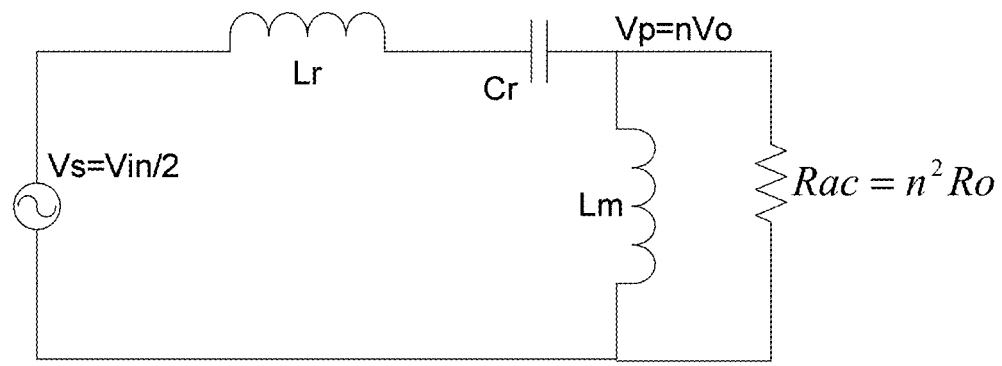

Fig. 3 -- Prior Art --
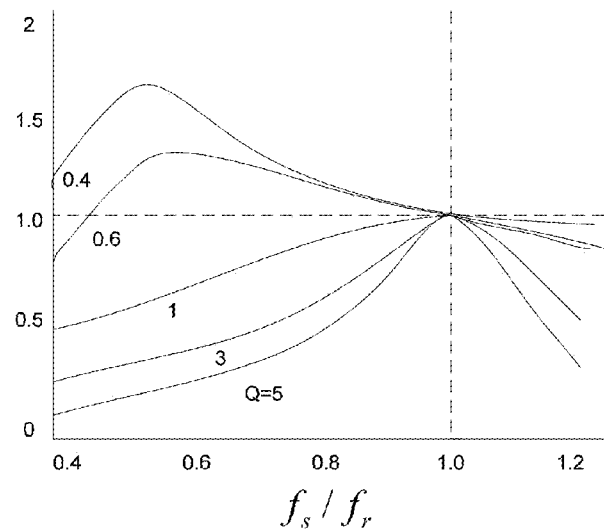
Fig. 4
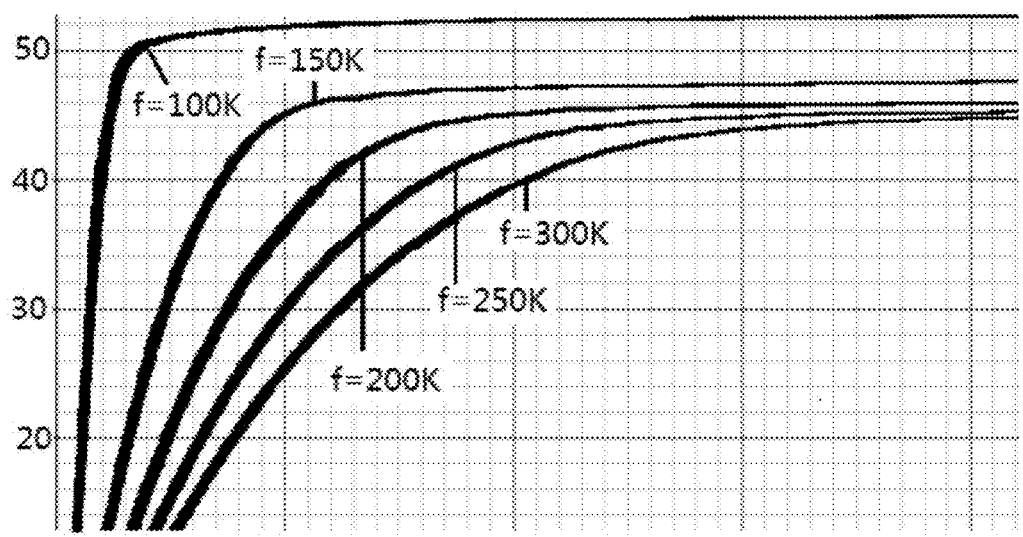

CONTROL METHOD FOR SERIES RESONANT CONVERTER

TECHNICAL FIELD

The disclosure relates to a resonant power conversion technology and more particularly to a control method for a series resonant converter.

BACKGROUND

With the development of power conversion technologies, high efficiency and high power density has become an important development trend. For its soft switching, high efficiency, high operating frequency, small size and other advantages, resonant converter has been widely used and has gained great attention in the application of the switch mode power supply technology. As a simple circuit topology, series resonant converter is capable of meeting the requirement for high frequency and achieving relatively high conversion efficiency and therefore has been widely applied in the industry.

Taking an LLC (short for Lr, Lm and Cr which represent resonance parameters, i.e., resonant inductance, excitation inductance and resonant capacitance respectively) series resonant converter as an example, when resonant elements on the converter work under a sinusoidal resonance condition, the voltage of a switching tube passes zero naturally to realize the zero-voltage switch-on or switch-off of a primary-side switching tube, resulting in a very small power consumption. Thus, this topology generally adopts a Pulse Frequency Modulation (PFM) control mode.

FIG. 1 shows the main circuit topology of a half-bridge LLC series resonant converter. When the circuit performs PFM control, duty cycles of power tubes Q1 and Q2 are both 0.5, thus, the control is performed through the complementary frequency modulation of fixed dead zones. FIG. 2 shows an equivalent circuit of the resonant network of the main circuit of an LLC series resonant converter, it can be seen from the equivalent circuit diagram that the direct voltage gain of the main circuit of the LLC series resonant converter can be expressed by the following expression:

$$M = 2n\frac{V_O}{V_{in}} = \frac{1}{2n\sqrt{\left(1 + \frac{L_r}{L_m} - \frac{L_r}{L_m(f_s/f_r)^2}\right)^2 + Q^2\left(\frac{f_s}{f_r} - \frac{f_r}{f_s}\right)^2}} \quad (1)$$

in which $V_o$ is an output voltage, $V_{in}$ is an input voltage, $f_s$ is a operating frequency (that is, the switch-on frequency of a switching tube), $f_r$ is the resonance frequency of a first working region, expressed by $$f_r = \frac{1}{2\pi\sqrt{C_r L_r}},$$

$L_r$ is resonant inductance, $L_m$ is excitation inductance, and Q is a quality factor which is expressed as follows:

$$Q = \frac{Z_O}{R_{ac}} = \frac{1}{R_{ac}}\sqrt{\frac{L_r}{C_r}}. \quad (2)$$

FIG. 3 is a schematic diagram showing the gain characteristic curve of the LLC series resonant converter drawn based on expression (1), and as shown in FIG. 3, the gain characteristic curve of the LLC series resonant converter can be divided into three regions by performance characteristic. The LLC series resonant converter is in a first working region when $f_s$ is greater than $f_r$, it is in a second working region when $f_s$ is greater than $f_m$ but smaller than $f_r$, and in a third working region when $f_s$ is smaller than $f_m$. In expression (2), $C_r$ is resonant capacitance and $f_m$ is the resonance frequency of the second working region and is expressed as follows:

$$f_m = \frac{1}{2\pi\sqrt{C_r(Lr + Lm)}}.$$

When the operating frequency $f_s$ is greater than the resonance frequency $f_r$, the excitation inductor $L_m$, as a load, takes no part in resonance, then the working mode of the LLC series resonant converter is analogous to that of an ordinary series resonant converter (SRC). When the converter outputs no load or a light load, $R_{ac}$ approaches infinity, Q approximates to 0, thus, the expression (1) can be simplified as follows:

$$M = \frac{1}{2n}\frac{1}{1 + \frac{L_r}{L_m} - \frac{L_r}{L_m}\left(\frac{f_r}{f_s}\right)^2}. \quad (3)$$

It can be seen from the expression (3) that the operating frequency of the LLC series resonant converter rises or the resonance frequency of the LLC series resonant converter falls when the LLC series resonant converter works in a no-load or light-load state, resulting in a reduction in voltage gain; when $f_s$ is greater than $f_r$, a small change of the gain will cause a great frequency change, thus, the output voltage of the LLC series resonant converter is hardly stable when the LLC series resonant converter is unloaded or lightly loaded. It can be seen from FIG. 3 that the gain characteristic curve trends towards flat when the LLC series resonant converter works at a low voltage when lightly loaded, to stabilize the voltage, an extremely high operating frequency is required, however, a series of problems will be caused when the operating frequency is extremely high, for instance, the optimization of a magnetic device becomes difficult, the switching loss is increased, and the reliability is lowered; moreover, when the load approximates to empty, the output voltage increases as the frequency or duty cycle of the LLC series resonant converter rises, making it impossible to control a negative feedback loop.

Currently, the following methods are adopted in the industry to overcome the problems above:

Method 1: a small dummy load is added under the no-load or light-load condition to implement regulation of the output voltage;

Method 2: under the no-load or light-load condition, a width modulation (or phase shift) control is performed, that is, the duty cycle (or phase shifting angle) of the switching tube is adjusted;

Method 3: under the no-load or light-load condition, a hybrid control combining width modulation (or phase shift) with frequency and width modulation is performed, that is, the duty cycle (or phase shifting angle) and the operating frequency of the switching tube are adjusted synchronously.

The foregoing three methods, although capable of overcoming the problems above, respectively have the following problems:

Method 1 achieves the voltage stabilization under a no-load condition but sacrifices the conversion efficiency of the converter when it is unloaded or lightly loaded;

Although method 2 greatly improves stability and implements voltage stabilization under a no-load or light-load condition, due to the nonlinearity of the gain characteristic curve during a width modulation process, the output voltage may decreases as the duty cycle increases, making it difficult to design a loop and hard to guarantee a feedback loop to be invariably stable and not to oscillate in a width modulation range; moreover, when the converter works near a load switching point, the switching between two control polices leads to the instability of the loop and undermines the overall output characteristic of the converter.

On the basis of method 2, method 3 adds frequency and width modulation control to guarantee the linear relationship of an output gain characteristic curve, this method partially eliminates the difficulty in loop design. However, practically, for a converter having a wide output range, it is hard to guarantee the output gain characteristic curve to be linear as the duty cycle varies when an extremely low voltage is output. Therefore, this method also suffers such practical engineering problems that it is difficult to control a loop and optimize a frequency and width modulation curve. Further, when the converter works near a load switching point, the switching between two control polices also leads to the instability of the loop and undermines the overall output characteristic of the converter.

The problems and defects of an unloaded or lightly-loaded converter working at a low voltage are described above by taking a half-bridge LLC series resonant converter as an example, and a full-bridge series resonant converter also confronts the same phenomenon. Theoretically, all series resonant circuits adopting frequency modulation control suffer the problems above.

SUMMARY

The object of the disclosure is to provide a control method for a series resonant converter to address the problem that the voltage of a series resonant converter in a low-voltage light-load or no-load state is unstable, effectively expand the output range of the series resonant converter and also address the problem of the difficulty in loop control caused by the non-monotony of the gain of an output voltage when a duty cycle is adjusted.

To achieve the purpose above, the technical solutions of the disclosure are as follows: a feedback signal is acquired by collecting an analog output signal of a series resonant converter and an operating frequency of the series resonant converter is changed according to the feedback signal; and a control mode of the series resonant converter is selected according to a load condition, wherein the series resonant converter adopts a hybrid control mode combining frequency and width modulation with width-fixed frequency modulation when lightly loaded or unloaded and a frequency modulation control mode when heavily loaded, wherein a switching can be conducted between the hybrid control mode and the frequency modulation control mode through hysteresis control.

In an embodiment, the operating frequency of the series resonant converter may be obtained by multiplying, a result of integration of an absolute value of a difference between the feedback signal and a predetermined value by a set ratio.

In an embodiment, when the series resonant converter adopts the hybrid control mode, the frequency and width modulation control mode may be a control mode at which frequency and duty cycle are adjusted and controlled synchronously.

In an embodiment, the method may further include: a frequency modulation state flag bit is set, a switching frequency corresponding to the frequency modulation state flag bit is preset, a calculated operating frequency is compared with a preset switching frequency, and the control mode of the series resonant converter is determined according to a result of the comparison.

In an embodiment, the frequency modulation state flag bit may be 0 or 1, when the frequency modulation state flag bit is 0, the preset switching frequency may be a first switching frequency, if the operating frequency of the series resonant converter is greater than the first switching frequency, the series resonant converter may adopt the hybrid control mode, otherwise, the frequency modulation state flag bit may be set to 1 so that the series resonant converter enters the frequency modulation control mode; when the frequency modulation state flag bit is 1, the preset switching frequency may be a second switching frequency, if the operating frequency of the series resonant converter is smaller than the second switching frequency, the series resonant converter may adopt the frequency modulation control mode, otherwise, the frequency modulation state flag bit may be set to 0 so that the series resonant converter enters the hybrid control mode.

In an embodiment, when the frequency modulation state flag bit is 0 and the operating frequency is smaller than the first switching frequency or when the frequency modulation state flag bit is 1 and the operating frequency is greater than the second switching frequency, the operating frequency may be set to a frequency value between the first switching frequency and the second switching frequency.

In an embodiment, under the hybrid control mode, when the operating frequency is greater than a predetermined value, the duty cycle of the working series resonant converter may be set to 0, when the operating frequency is between the first switching frequency and the second switching frequency, the series resonant converter may be enabled to adopt the width-fixed frequency modulation control mode, and when the working frequency is between the second switching frequency and the predetermined value, the series resonant converter may be enabled to adopt the frequency and width modulation control mode.

The control method provided herein has the following beneficial effects:

(1) due to the adoption of a hybrid control mode combining frequency and width modulation with width-fixed frequency modulation when a series resonant converter working at a low voltage is lightly loaded or unloaded, the operating frequency and the duty cycle of the series resonant converter are controlled, thus realizing a voltage stabilization function under a low-voltage light-load or no-load condition, effectively expanding the output range of the series resonant converter and synchronously addressing the problem of the difficulty in loop control caused by the non-monotony of the gain of an output voltage of the series resonant converter under a low-voltage light-load condition;

(2) the adoption of hysteresis control for the switching between two working modes of a hybrid control mode and a frequency modulation control mode addresses the problem of instable output caused by the repeated switching conducted between the two control modes when a series resonant converter works near a load switching point and effectively improves the stability of a loop during a switching process and the overall output performance index of the series resonant converter.

BRIEF DESCRIPTION OF THE DRAWINGS

FIG. 1 is a diagram illustrating the topological structure of the main circuit of a half-bridge LLC series resonant converter;

FIG. 2 is a diagram illustrating an equivalent circuit of the resonant network shown in FIG. 1;

FIG. 3 is a schematic diagram illustrating an LLC gain characteristic curve;

FIG. 4 is simulation diagram illustrating the output characteristic resulting from the adoption of a frequency modulation control in FIG. 1;

DETAILED DESCRIPTION

Figure 5:
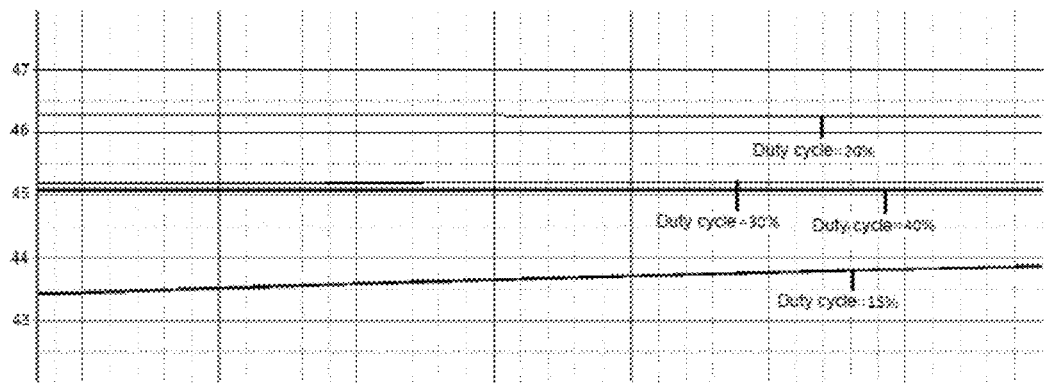
FIG. 5 is simulation diagram illustrating the output characteristic resulting from the adoption of a width modulation control in FIG. 1.

To set forth the technical content, the features, the object and the effect of the disclosure in detail, the disclosure is described below with reference to accompanying drawings when taken in conjunction with embodiments.

The control method provided herein is applicable to series resonant conversion circuits, including: LC Series Resonant Circuit (SRC), Series-Parallel Resonant Conversion Circuit (SPRC) and LLC Resonant Conversion Circuit, the circuit topology may be half-bridge type, full-bridge type and the like.

The control method provided herein is as follows:

a feedback signal is acquired by collecting an analog output signal of a series resonant converter, and an operating frequency of the series resonant converter is changed according to the feedback signal, and a control mode of the series resonant converter is selected according to a load condition, wherein the series resonant converter adopts a hybrid control mode combining frequency and width modulation with width-fixed frequency modulation when lightly loaded or unloaded and a frequency modulation control mode when heavily loaded, wherein a switching can be conducted between the hybrid control mode and the frequency modulation control mode through hysteresis control.

The switching to the hybrid control mode or the frequency modulation control mode for the load of the series resonant converter is determined by presetting two states (states of a frequency modulation flag bit) and switching frequencies corresponding to the states (as stated in detail hereinafter). Whether a load is a light load or heave load is set according to the practical application, for different series resonant converters and different application scenarios, light load and heavy load are classified differently.

Specific embodiments of the disclosure are still described by taking the half-bridge LLC series resonant converter shown in FIG. 1 as example. A half-bridge LLC series resonant converter further includes a processor, a memory unit, control switching tubes Q1 and Q2 and so on, which are well known by those skilled in the art and are therefore not shown in accompanying drawings or described here repeatedly.

For the convenience of description, output voltage characteristics of a half-bridge LLC series resonant converter presented when the half-bridge LLC series resonant converter adopts a frequency modulation control mode, a width modulation control mode and a frequency and width modulation control mode are described first.

FIG. 4 reveals corresponding output voltage characteristics of a half-bridge LLC series resonant converter which adopts a frequency modulation control mode and the duty cycle of which is 45% when the operating frequencies of the half-bridge LLC series resonant converter are 100K, 150K, 200K, 250K and 300K on the condition that the half-bridge LLC series resonant converter works under the same light-load open loop condition.

It can be seen from FIG. 4 that the change range of the output voltage of the half-bridge LLC series resonant converter becomes very small as the operating frequency rises, which limits the output regulation capacity of the half-bridge LLC series resonant converter.

FIG. 5 reveals corresponding output voltage characteristics of a half-bridge LLC series resonant converter which adopts a width modulation control mode and the working frequency of which is 300K when the duty cycles of the half-bridge LLC series resonant converter are 15%, 20%, 30%, 40% and 45% on the condition that the half-bridge LLC series resonant converter works under the same light-load open loop condition.

It can be seen from FIG. 5 that the introduction of a width modulation control greatly improves the output regulation capacity of the converter, however, it can also be seen from FIG. 5 that the output voltage rises while the duty cycle falls, which leads to the non-monotony of the gain of the output voltage of the half-bridge LLC series resonant converter and the difficulty in loop control.

Figure 6:
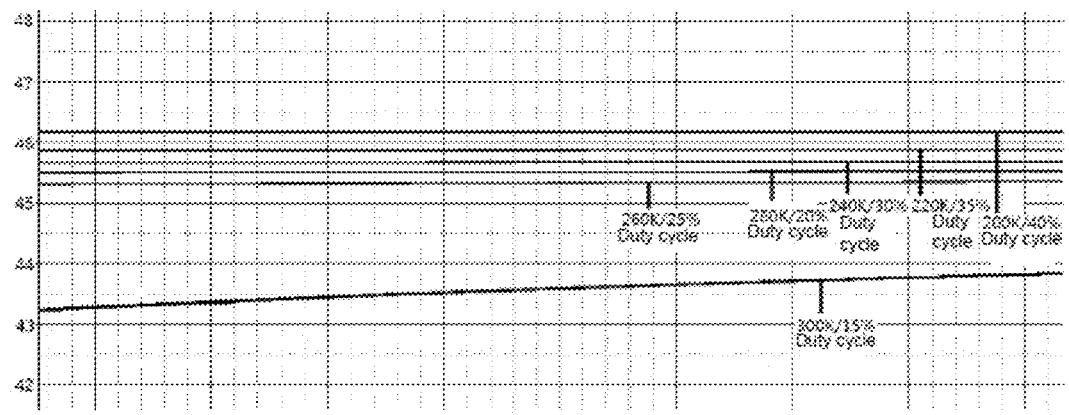
FIG. 6 is simulation diagram illustrating the output characteristic resulting from the adoption of a frequency and width modulation control in FIG. 1.

FIG. 6 reveals corresponding output voltage characteristics of a half-bridge LLC series resonant converter adopting a frequency and width modulation control mode when correspondences between the frequency and the duty cycle of the half-bridge LLC series resonant converter are as follows: 300K/15%, 280K/20%, 260K/25%, 240K/30%, 220K/35% and 200K/40% on the condition that the half-bridge LLC series resonant converter works under the same light-load open loop condition.

It can be seen from FIG. 6 that after the frequency and width modulation control is introduced, although the output voltage substantially changes linearly with a set frequency-duty cycle control curve, the output voltage gain of the half-bridge LLC series resonant converter is not monotonous and severely non-linear, which leads to a grain mutation. Thus, the problem that it is difficult to control a loop still exists.

The control method disclosed herein is described below in detail.

Figure 7:
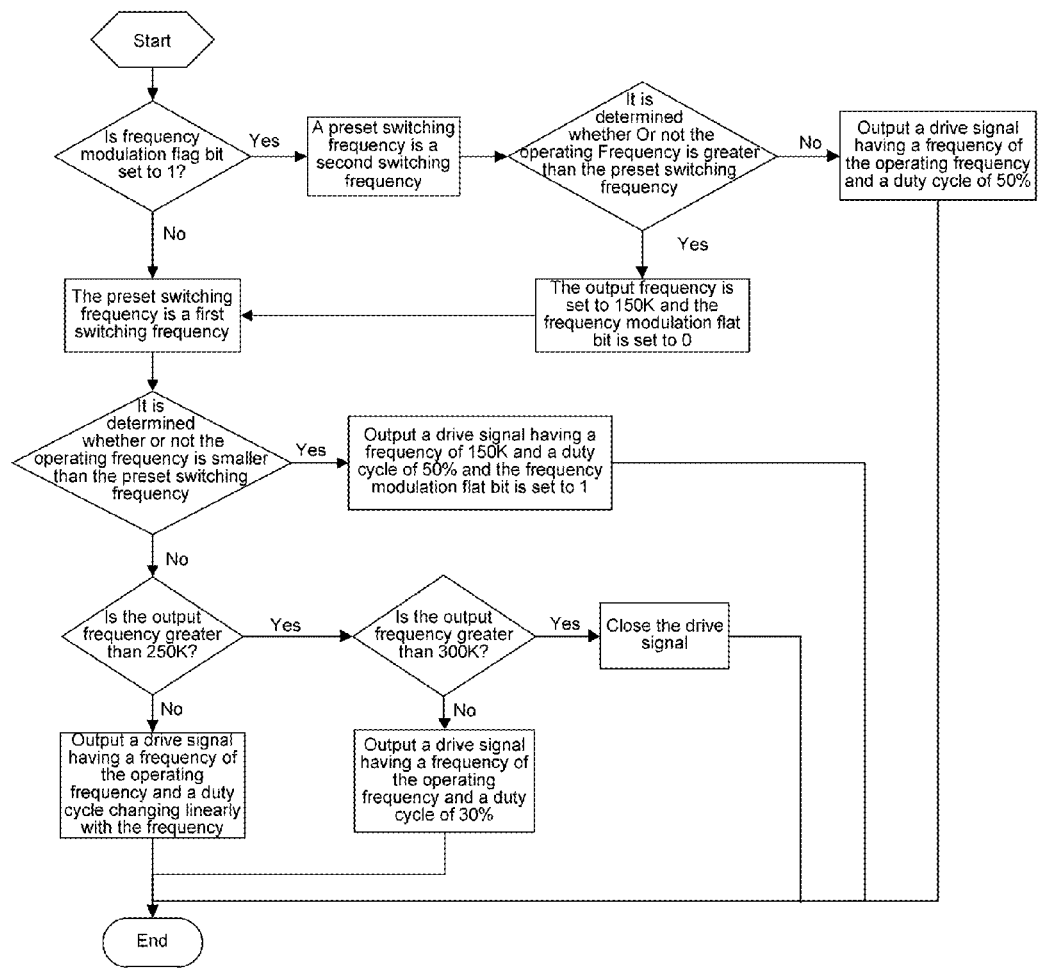
FIG. 7 is a preferred flowchart illustrating a control method for a resonant converter according to an embodiment of the disclosure.

Referring to FIG. 7 which is a flowchart illustrating a control method according to an embodiment of the disclosure, in FIG. 7, a corresponding control is performed by making a determination on a frequency modulation flag bit which is preset in a half-bridge LLC series resonant converter software and which is 0 or 1.

When the frequency modulation flag bit is 0, the value of the preset switching frequency is set to be a first switching frequency which is set to 110K in the embodiment, if it is determined that operating frequencies of switching tubes Q1 and Q2 are smaller than the first switching frequency (that is, smaller than 110K), then the load of the half-bridge LLC series resonant converter is determined to be a heavy load, the operating frequencies of the switching tubes Q1 and Q2 are set to 150K (duty cycle is 50%), the analog output signal of the series resonant conversion circuit is sampled to obtain a feedback signal, the absolute value of the difference of the feedback signal and a predetermined value is subjected to an integral operation and then multiplied by a set ratio to obtain the operating frequencies of the switching tubes Q1 and Q2 in the next cycle, meanwhile, the frequency modulation flag bit is set to 1 to enter a frequency modulation control mode; and if the operating frequencies of switching tubes Q1 and Q2 are not smaller than the first switching frequency, then the load of the half-bridge LLC series resonant converter is determined to be a light load or no load, in this case, the half-bridge LLC series resonant converter works in a hybrid control mode.

The predetermined value and the set ratio are determined according to parameters of the half-bridge LLC series resonant converter and actual operation requirements.

When the frequency modulation flag bit is 1, the value of the preset switching frequency is set to a second switching frequency which is set to 250K in the embodiment, if the operating frequencies of switching tubes Q1 and Q2 are greater than the second switching frequency (that is, greater than 250K), then the load of the half-bridge LLC series resonant converter is determined to be a light load or no load, the operating frequencies of the switching tubes Q1 and Q2 are set to 150K (duty cycle is 30%), the analog output signal of the series resonant conversion circuit is sampled to obtain a feedback signal, the absolute value of the difference of the feedback signal and a predetermined value is subjected to an integral operation and then multiplied by a set ratio to obtain the operating frequencies and the duty cycles of the switching tubes Q1 and Q2 in the next cycle, meanwhile, the frequency modulation flag bit is set to 0 to enter a hybrid control mode; and if the operating frequencies of switching tubes Q1 and Q2 are not greater than the second switching frequency, the load of the half-bridge LLC series resonant converter is determined to be a heavy load, in this case, the half-bridge LLC series resonant converter works under a frequency modulation control mode.

Specifically, the control method adopted in the hybrid control mode in the embodiment is as follows:

under the hybrid control mode, the operating frequency is between the first switching frequency and the second switching frequency, and a control mode of adjusting the frequency while keeping the duty cycle fixed is adopted, that is, the duty cycles of the switching tubes Q1 and Q2 are fixed to 30%;

under the hybrid control mode, the operating frequency is between the second switching frequency and 300K, and a control mode of synchronously adjusting the frequency and the duty cycle is adopted, that is, the duty cycles of the switching tubes Q1 and Q2 are linearly changed between 30% to 15%; and under the hybrid control mode, the frequency is above 300K, the duty cycles of the switching tubes Q1 and Q2 are 0.

Figure 8:
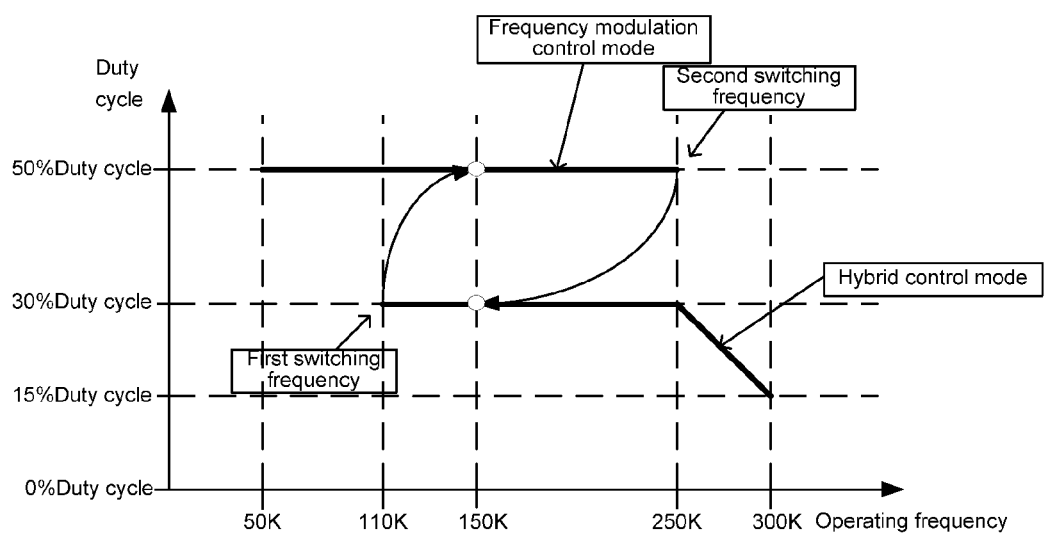
FIG. 8 is a diagram illustrating correspondences between a duty cycle and a frequency in a specific control process according to an embodiment of the disclosure.

Referring to FIG. 8 which reflects correspondences between a duty cycle and a frequency in a specific control process of the embodiment, the main control idea of the control method provided herein can be intuitively learned from FIG. 8.

Due to the adoption of a hybrid control mode combining frequency and width modulation with width-fixed frequency modulation to control the operating frequency and the duty cycle of the switching tube of a series resonant converter when the series resonant converter works under a low-voltage light-load or no-load condition, a voltage stabilization function is achieved when the series resonant converter is under a low-voltage light-load or no-load condition, the output range of the series resonant converter is effectively expanded, and the problem that it is difficult to control a loop under a low-voltage light-load condition due to the non-monotony of the gain of an output voltage is addressed; moreover, the adoption of hysteresis control for the switching between two working modes of a hybrid control mode and a frequency modulation control mode addresses the problem of instable output caused by the repeated switching conducted between the two control modes when a series resonant converter works near a load switching point and effectively improves the stability of a loop during a switching process and the overall output performance index of the series resonant converter.

It should be noted that all the specific data given in the foregoing embodiment are merely exemplary but not to be considered as limiting the disclosure, and the data can be set as required in actual applications.

The above mentioned are only preferred embodiments of the disclosure but not to be construed as limiting the scope of the disclosure, and it should be appreciated that the equivalents made by those skilled in the art without departing from the scope of the present disclosure should fall within the protection scope of the present disclosure.

INDUSTRIAL APPLICATION

By adopting a hybrid control mode when a series resonant converter is lightly loaded or unloaded and switching between the hybrid control mode and a frequency modulation control mode through hysteresis control, the disclosure effectively addresses the problem that the voltage of a series resonant converter is unstable when the series resonant converter is lightly loaded or unloaded at a low voltage, effectively expands the output range of the series resonant converter, and also addresses the problems that it is difficult to control a loop due to the monotony of the gain of an output voltage during a duty cycle adjustment process, thus effectively improves the loop stability during a switchover and the overall output performance index of the series resonant converter.

The invention claimed is:

1. A control method for a series resonant converter, comprising: acquiring a feedback signal by collecting an analog output signal of the series resonant converter, and changing an operating frequency of the series resonant converter according to the feedback signal; and selecting a control mode of the series resonant converter according to a load condition, wherein the series resonant converter adopts a hybrid control mode combining frequency and width modulation with width-fixed frequency modulation when lightly loaded or unloaded and a frequency modulation control mode when heavily loaded, wherein a switching can be conducted between the hybrid control mode and the frequency modulation control mode through hysteresis control, wherein the method further comprises: setting a frequency modulation state flag bit, presetting a switching frequency corresponding to the frequency modulation state flag bit, comparing a calculated operating frequency with a preset switching frequency, and determining the control mode of the series resonant converter according to a result of the comparison, wherein the frequency modulation state flag bit is 0 or 1, when the frequency modulation state flag bit is 0, the preset switching frequency is a first switching frequency, if the operating frequency of the series resonant converter is greater than the first switching frequency, the series resonant converter adopts the hybrid control mode, otherwise, the frequency modulation state flag bit is set to 1 so that the series resonant converter enters the frequency modulation control mode; when the frequency modulation state flag bit is 1, the preset switching frequency is a second switching frequency, if the operating frequency of the series resonant converter is smaller than the second switching frequency, the series resonant converter adopts the frequency modulation control mode, otherwise, the frequency modulation state flag bit is set to 0 so that the series resonant converter enters the hybrid control mode.

2. The control method for a series resonant converter according to claim 1, wherein the operating frequency of the series resonant converter is obtained by multiplying, a result of integration of an absolute value of a difference between the feedback signal and a predetermined value, by a set ratio.

3. The control method for a series resonant converter according to claim 1, wherein when the series resonant converter adopts the hybrid control mode, the frequency and width modulation control mode is a control mode at which frequency and duty cycle are adjusted and controlled synchronously.

4. The control method for a series resonant converter according to claim 1, wherein when the frequency modulation state flag bit is 0 and the operating frequency is smaller than the first switching frequency or when the frequency modulation state flag bit is 1 and the operating frequency is greater than the second switching frequency, the operating frequency is set to a frequency value between the first switching frequency and the second switching frequency.

5. The control method for a series resonant converter according to claim 1, wherein under the hybrid control mode, when the operating frequency is greater than a predetermined value, the duty cycle of the working series resonant converter is set to 0, when the operating frequency is between the first switching frequency and the second switching frequency, the series resonant converter is enabled to adopt the width-fixed frequency modulation control mode, and when the operating frequency is between the second switching frequency and the predetermined value, the series resonant converter is enabled to adopt the frequency and width modulation control mode.

* * * * *